(12) United States Patent
Kadantseva et al.

(10) Patent No.: US 7,873,233 B2
(45) Date of Patent: Jan. 18, 2011

(54) METHOD AND APPARATUS FOR RENDERING AN IMAGE IMPINGING UPON A NON-PLANAR SURFACE

(75) Inventors: Tatiana Pavlovna Kadantseva, Vancouver (CA); Doug McFadyen, Delta (CA)

(73) Assignee: Seiko Epson Corporation, Tokyo (JP)

( * ) Notice: Subject to any disclaimer, the term of this patent is extended or adjusted under 35 U.S.C. 154(b) by 1103 days.

(21) Appl. No.: 11/550,153

(22) Filed: Oct. 17, 2006

(65) Prior Publication Data

US 2008/0088526 A1    Apr. 17, 2008

(51) Int. Cl.
G06K 9/40    (2006.01)
G06K 9/36    (2006.01)
G06K 9/32    (2006.01)
G09G 5/00    (2006.01)

(52) U.S. Cl. ............... 382/275; 382/276; 382/294; 345/1.1; 345/7

(58) Field of Classification Search .............. None
See application file for complete search history.

(56) References Cited

U.S. PATENT DOCUMENTS

| | | | |
|---|---|---|---|
| 3,422,306 A | 1/1969 | Gray | |
| 3,723,805 A | 3/1973 | Scarpino et al. | |
| 4,606,606 A | 8/1986 | Freeman | |
| 4,658,246 A | 4/1987 | Kuperman | |
| 4,880,287 A | 11/1989 | Moss | |
| 5,054,097 A * | 10/1991 | Flinois et al. | 382/294 |
| 5,231,481 A | 7/1993 | Eouzan et al. | |
| 5,302,964 A | 4/1994 | Lewins | |
| 5,499,139 A | 3/1996 | Chen et al. | |
| 5,768,443 A * | 6/1998 | Michael et al. | 382/294 |
| 5,796,426 A | 8/1998 | Gullichsen et al. | |
| 5,805,728 A * | 9/1998 | Munesada et al. | 382/199 |
| 5,907,640 A * | 5/1999 | Delean | 382/276 |
| 5,990,941 A | 11/1999 | Jackson et al. | |
| 6,173,087 B1 * | 1/2001 | Kumar et al. | 382/284 |

(Continued)

FOREIGN PATENT DOCUMENTS

JP    2000019449    1/2000

(Continued)

OTHER PUBLICATIONS

Implementation of Multi-Projector Displays, CAO Shuangxi and Chen Fumin, Department of Computer Science and Technology, Tongji University, Shanghai 200092, Feb. 28, 2005, (pp. 84-86).

(Continued)

*Primary Examiner*—Vikkram Bali
*Assistant Examiner*—Michelle Entezari
(74) *Attorney, Agent, or Firm*—Mark P. Watson (57) ABSTRACT

The present invention is directed to a method and system to render an image that impinges upon a non-planar surface to attenuate, if not abrogate, distortions introduced by the surface that features mapping the image as a plurality of spaced-apart planar cells to coordinates of the non-planar surface to produce a plurality of the inverted planar cells, with each of the cells including multiple pixels of the image, minimizing a distance between the cells while minimizing a change in the distance of each of the plurality of cells with respect to the surface coordinates; and impinging the plurality of planar cells upon the non-planar surface.

8 Claims, 6 Drawing Sheets

U.S. PATENT DOCUMENTS

| | | | |
|---|---|---|---|
| 6,345,129 B1* | 2/2002 | Aharon | 382/284 |
| 6,456,340 B1 | 9/2002 | Margulis | |
| 6,503,201 B1 | 1/2003 | Liu et al. | |
| 6,532,113 B2 | 3/2003 | Aoki et al. | |
| 6,715,888 B1 | 4/2004 | Raskar et al. | |
| 6,771,423 B2 | 8/2004 | Geist | |
| 6,793,350 B1 | 9/2004 | Raskar et al. | |
| 6,850,211 B2 | 2/2005 | Deppe | |
| 6,870,532 B2 | 3/2005 | Travers et al. | |
| 7,042,497 B2 | 5/2006 | Gullichsen et al. | |
| 7,379,619 B2* | 5/2008 | Ikeda et al. | 382/276 |
| 7,733,404 B2* | 6/2010 | Zandifar et al. | 348/333.01 |
| 2002/0063802 A1 | 5/2002 | Gullichsen et al. | |
| 2003/0007679 A1* | 1/2003 | Ohki | 382/154 |
| 2003/0011536 A1* | 1/2003 | Chevreau et al. | 345/7 |
| 2003/0030597 A1 | 2/2003 | Geist | |
| 2003/0085848 A1 | 5/2003 | Deppe | |
| 2003/0184860 A1 | 10/2003 | Hakkinen | |
| 2004/0156558 A1 | 8/2004 | Kim | |
| 2004/0161164 A1* | 8/2004 | Dewaele | 382/289 |
| 2004/0179271 A1 | 9/2004 | Verbeque et al. | |
| 2004/0184013 A1* | 9/2004 | Raskar et al. | 353/121 |
| 2005/0007477 A1 | 1/2005 | Ahiska | |
| 2005/0078378 A1 | 4/2005 | Geist | |
| 2005/0088385 A1* | 4/2005 | Elliott et al. | 345/87 |
| 2005/0157398 A1 | 7/2005 | Nagaoka et al. | |
| 2005/0190991 A1* | 9/2005 | McCleese | 382/294 |
| 2005/0219522 A1 | 10/2005 | Jones | |
| 2006/0007170 A1 | 1/2006 | Wilson et al. | |
| 2006/0023078 A1 | 2/2006 | Schmitt et al. | |
| 2006/0098168 A1 | 5/2006 | McDowall et al. | |

FOREIGN PATENT DOCUMENTS

| | | |
|---|---|---|
| JP | 2003-348500 | 12/2003 |
| JP | 2005-528833 | 9/2005 |
| WO | 8809942 | 12/1988 |
| WO | 02073535 | 9/2002 |
| WO | 03017655 | 2/2003 |
| WO | 03/102904 | 12/2003 |

OTHER PUBLICATIONS

Texture Mapping on Arbitrarily Curved Surfaces By Using Planar Development, Ding Jiyun, Department of Computers, Hunan Light Industry High Training School, Changsha 410007, and Li Sikun, Institute of Computer, National University of Defence Technology, Changsha 410073, Jun. 30, 2001, (pp. 46-50).

* cited by examiner

METHOD AND APPARATUS FOR RENDERING AN IMAGE IMPINGING UPON A NON-PLANAR SURFACE

BACKGROUND OF THE INVENTION

The present invention relates generally to a display device for use in a vehicle and, more specifically, to a heads-up-display (HUD) for use in an automobile.

Distortion produced by optical properties of substrates upon which an image impinges has long been a source of concern in the imaging industry. As a result, many prior art attempts have been set forth to correct for distortion created in images due to the rendering technology employed.

U.S. Pat. No. 3,422,306 discloses a distortion correction circuit for eliminating distortion in a magnetically-deflected cathode ray tube. In pertinent part, uncorrected deflection signals are pre-distorted in an inverse manner to the distortion caused by the cathode ray tube to produce corrected deflected signals. When applied to deflection amplifiers, the corrected deflected signal causes deflection in the cathode ray tube free of pincushion and non-linearity distortions.

U.S. Pat. No. 4,658,246 discloses a system for simulating the display of visual images by a matrix of liquid crystal cells or other matrix elements and providing flexibility in selecting display characteristics such as element size, active area ratio, and signal noise content. The display employs a cathode ray tube and uses software signal processing.

U.S. Pat. No. 5,302,964 discloses a heads-up display for an aircraft that includes a digital image generator, a cathode ray tube (CRT) and an optical system that projects an image formed on the CRT screen indicating the status of the aircraft operation onto a holographic mirror combiner at a slant angle. The combiner is transparent to the pilot's direct view through the aircraft windshield, but produces a reflected image of the CRT screen that is superimposed on the direct view. Pincushion distortion in the CRT and geometric distortion caused by the slant projection angle are corrected by a digital look-up table memory that alters the initially orthogonal CRT horizontal and vertical deflection signals in a manner which is the inverse of the distortion such that the image on the combiner as viewed by the pilot appears undistorted.

U.S. Pat. No. 6,532,113 discloses display device for use in a vehicle in which an image is projected on a windshield of a vehicle so that the foreground of the vehicle and a virtual image of the image for superposition are accurately seen together even when a seat position and a physique of a driver change and when a shape of the windshield changes. A light of inverse image for superposition displayed on a display surface of a display unit in a dashboard in a vehicle is projected on a windshield so that the driver sees the foreground visible through the windshield together with a virtual image of the inverse image for superposition reflected on the windshield in front of an eye point that is a virtual image of the original image for superposition. In order to cancel out distortion arisen when the light of the inverse image for superposition is reflected on the windshield, the inverse image for superposition displayed on the display unit is distorted in advance in response to the contents stored in an external ROM provided in a control unit, which is replaceable with another ROM storing the different contents.

A need exists, therefore, to provide improved optical imaging techniques in which distortion introduced by optical properties upon which an image impinges are attenuated, if not abrogated.

SUMMARY OF THE INVENTION

The present invention is directed to a method and system to render an image that impinges upon a non-planar surface that features mapping the image as a plurality of spaced-apart planar cells to coordinates of the non-planar surface, with each of the cells including multiple pixels of the image. The distance between the cells is minimized while minimizing a distance of each of the plurality of cells with respect to the surface coordinates; and impinging the plurality of planar cells upon the non-planar surface. With these steps an image that undergoes distortion as a result of impinging upon a non-planar surface may be rendered while minimizing the distortion perceived by a viewer. The image may be rendered by projecting the same with an image rendering device so as to be rendered with minimal distortions upon the non-planar surface, or spaced-apart from the non-planar surface. When rendered spaced-apart from the non-planar surface, the rendering region may be disposed so as to be positioned between the non-planar surface and the image rendering device or positioned so as that there is non-planar surface between the image rendering device and the image rendered. To that end, mapping includes associating pixels of the image with a plurality of polygons, each of which defines one of the plurality of spaced-apart cells and includes multiple vertices having an initial spatial relationship. The vertices are mapped to coordinates of the non-planar surface, producing mapped polygons. A matrix of distortion coefficients is generated from the vertices of the mapped polygons. The distortion coefficients define a relative spatial relationship among the pixels upon the non-planar surface. Produced from the distortion matrix is an inverse matrix having a plurality of inverting coefficients associated therewith. The image rendering device impinges pixels of upon the non-planar surface with the relative spatial relationship among the pixels of each of the mapped polygons defined by the inverting coefficients, producing inverted polygons. In this manner, distortions introduced by the non-planar surface are substantially negated by impinging the image mapped according to the inverted polygons upon the non-planar surface. In a first alternate embodiment, the quality of the image being rendered may be improved by fitting the edges of adjacent inverted polygons to one or more linear functions, located between the edges, employing a least-squares fit. In a second alternate embodiment, polygons are mapped to areas of the non-planar surface where there are minimal variations in the radius of curvature over the portion of the image associated with one of the polygons. These and other embodiments are described more fully below.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
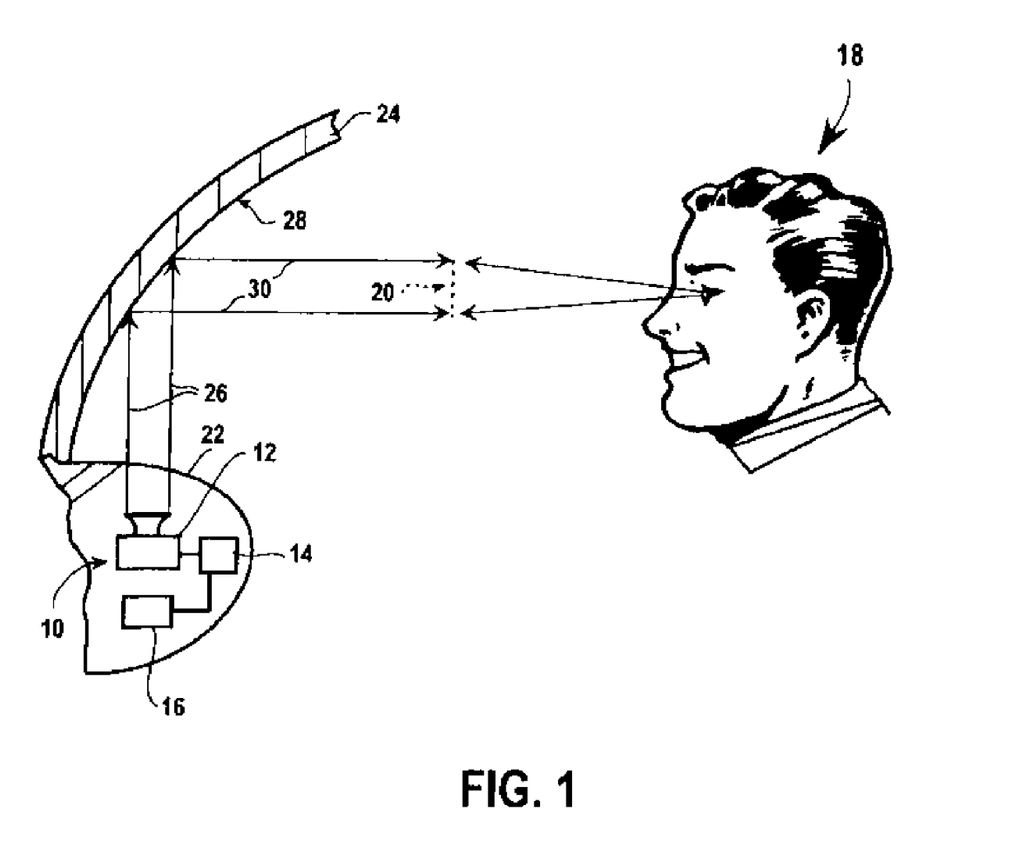
FIG. 1 is an illustration of a system in accordance with one embodiment of the present invention.

Referring to FIG. 1 a system 10 in accordance with one embodiment of the present invention includes an image rendering device 12, such as a projector, in data communication with a processor 14 that may be a general processor, finite state machine or any other circuit capable of manipulating image data as discussed herein. A memory 16 is in data communication with processor 14. Image rendering device 12 is situated in a vehicle, such as an automobile, motorcycle, aircraft and the like, so that a user 18 can visually perceive an image produced thereby in a viewing region 20. Image rendering device 12 functions as a heads-up-display (HUD). To that end, image rendering device 12 operates to render an image of desired instrumentations, in region 20 that is located in the field of view of user 18 in the ordinary operation of the vehicle: The image of the instrumentation cluster (not shown) that is ordinary present in dashboard 22. Typically, the content of the image rendered in region 20 is a real-time representation of the operation of the automobile that may be obtained employing standard techniques. To that end, an image of a speedometer (not shown), tachometer (not shown), clock (not shown), compass (not shown), oil pressure gauge (not shown) and the like may be rendered in region 20. The information presented by the instrumentation cluster may be rendered in region 20, without rendering an image of the instrumentation cluster (not shown) or the individual gauges contained therein. Alternatively, it is also possible that the image rendered in region 20 includes information concerning operational characteristics of the vehicle not presented by the instrumentation cluster (not shown), e.g., some automobiles are not provided with a tachometer (not shown); however, tachometer signals may be present in the vehicle. The present invention may be employed to render an image corresponding to tachometer signals in region 20. As a result the present invention is ideal for backwards compatibility to existing automobiles in that it affords the functionality of increasing the information perceivable by user 18 concerning operational characteristics of the vehicle.

In the present example, user 18 and region 20 are spaced-apart from a windshield 24 and positioned so that region 20 will be in a field of view of user 18 looking through windshield 24. This is achieved by image rendering device 12 projecting an image as a plurality of pixels shown by rays 26, to impinge upon windshield 24, with image rendering device 12, processor 14 and memory 16 being mounted within a dashboard 22 from which windshield 24 extends. As shown, image rendering device 12 generates images in region 20 by having pixels reflect from a surface 28 of windshield 24, shown by rays 30 producing a virtual image of the original image in region 20.

Figure 2:
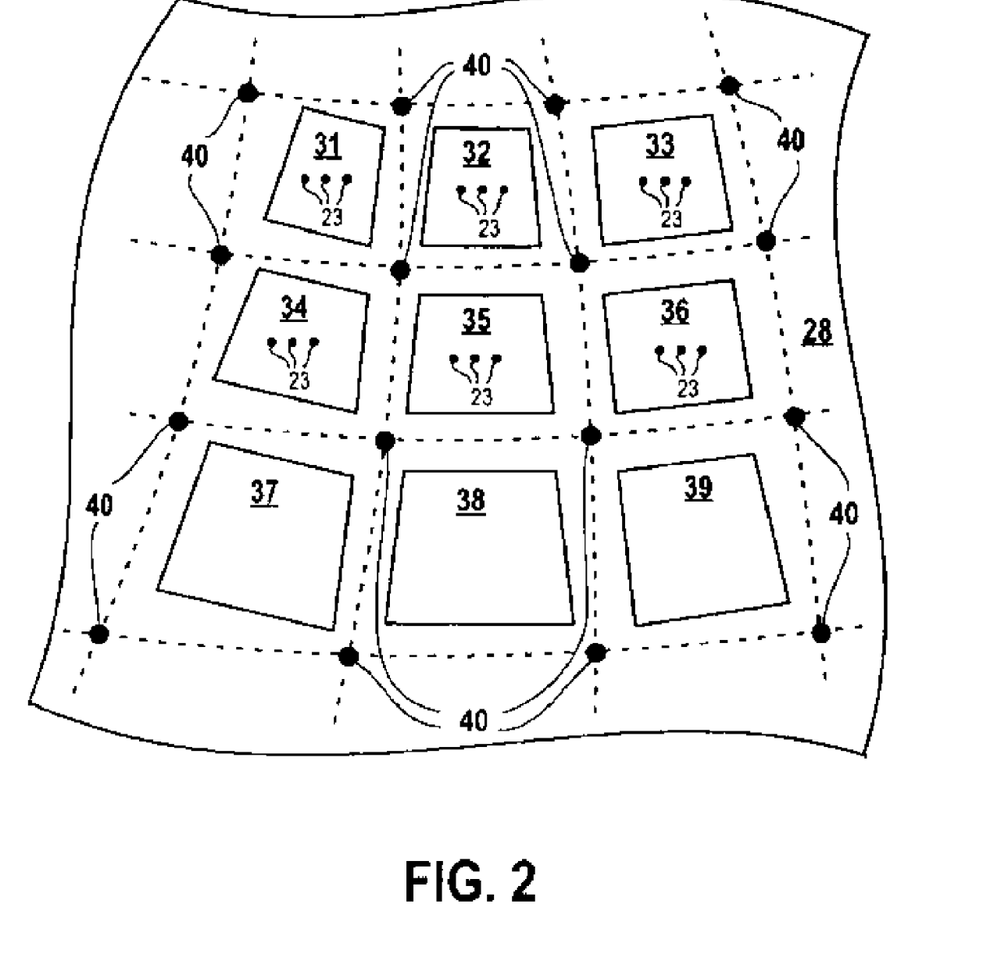
FIG. 2 a plan view of a cell, each of which contains information corresponding to different sub-portions of an image, which are mapped to a non-planar surface in accordance with one embodiment of the present invention.

Referring to both FIGS. 1 and 2 a problem encountered with rendering an image, virtual or otherwise, in region 20 is compensating for distortions introduced by surface 28. As is well known, most windshields in automobiles, motorcycles, aircraft, boats and the like are non-planar and typically curved, which is the case with surface 28. The non-planarity of surface 28 introduces distortion in the rendered thereupon and/or reflected therefrom and rendered in region 20. To attenuate, if not abrogate, distortions introduced by surface 28, one embodiment of the present invention maps the image represented by rays 26 as a plurality of spaced-apart cells 31-39 to coordinates 40 of surface 28, with each of cells 31-39 including multiple pixels 23 of the image. Each of cells 31-39 represents an inverse of the distortion represented by the areas or surface 28 to which coordinates 40 correspond, with the understanding that coordinate are obtain during a calibration process described in co-pending U.S. patent application Ser. No. 11/550,180, which is incorporated by reference in its entirety.

Image rendering device 12 impinges the plurality of cells 31-39 upon surface 28, which removes the distortion presented by surface 28, thereby attenuating the distortion present in the resulting image rendered at location 20. In an alternate embodiment, the distance between adjacent cells 31-39 is minimized while minimizing a change in spatial position of each of the plurality of cells 31-39 with respect to coordinates 40. Both of these embodiments are discussed further below.

Figure 3:
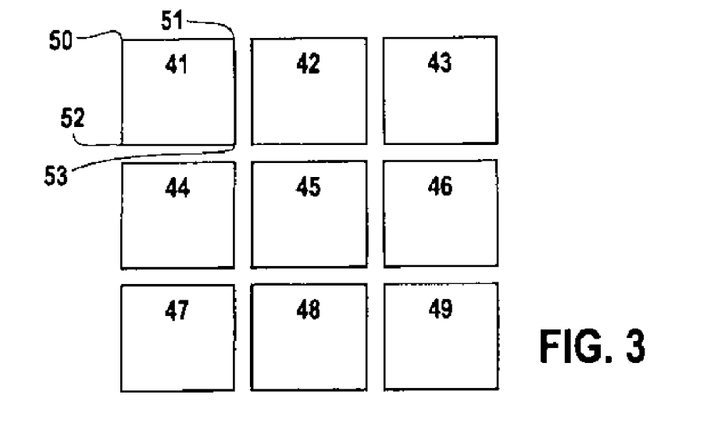
FIG. 3 is a plan view of associating an image with a plurality of cells in accordance with the present invention.

Referring to both FIGS. 2 and 3, mapping of pixels 23 of the image to cells 31-39 includes associating pixels 23 of the image with a plurality of polygons e.g., squares 41-49. In the present example nine squares are shown as being spaced-apart for clarity of discussion. Each of squares 41-49 has multiple vertices 50-53, i.e., four vertices. Vertices 50-53 have an initial relative spatial relationship defined by the shape of squares 41-49. With respect to square 41 the initial spatial relation is described as each pair of adjacent vertices being collinear and spaced-apart from one another a distance equal to the distance that the vertices of each of the remaining pairs of vertices are spaced-apart. Vertices 50-53 for each of squares 41-49, are mapped to surface 28 as vertices 54-57 that define a plurality of mapped polygons 61-69, shown in FIG. 4.

Figure 4:
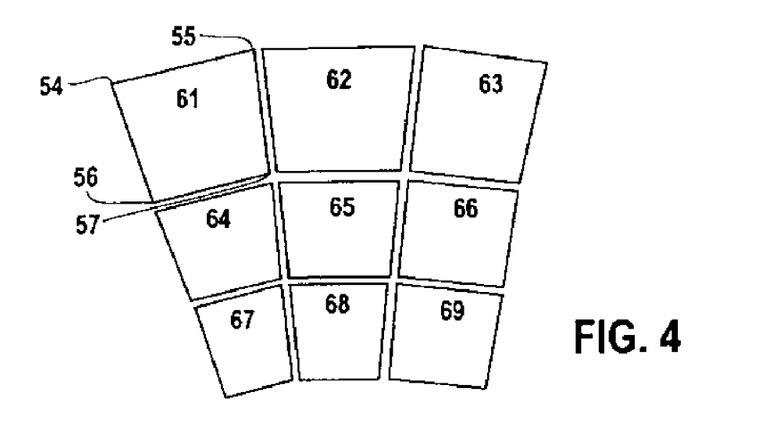
FIG. 4 is a plan view of mapping vertices of the cells, shown in FIG. 2, to a non-planar surface in accordance with the present invention.
Figure 5:
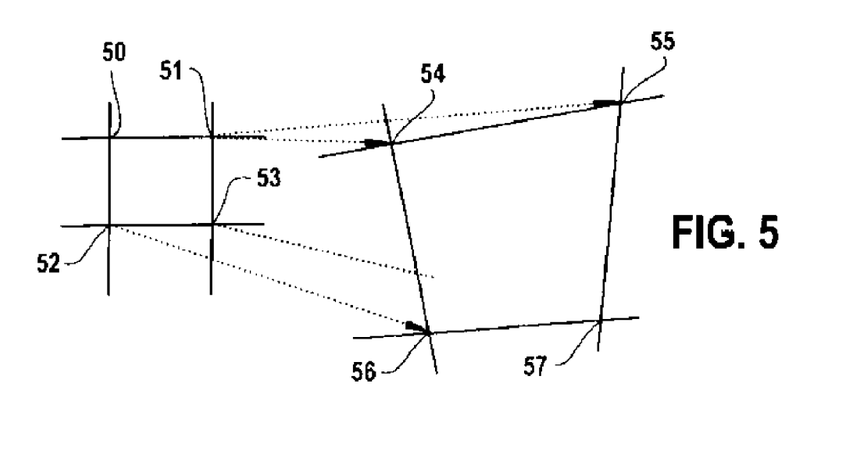
FIG. 5 is a detailed plan view of mapping vertices of one of the cells, shown in FIG. 3, to the non-planar surface, shown in FIG. 4, in accordance with the present invention.

Referring to FIGS. 3, 4 and 5, vertices 50-53 for each of squares 41-49 are mapped to surface 28 so that there is one-to-one correspondence between mapped polygons 61-69 and squares 41-49. As a result each of square 41-49 corresponds to one of polygons 61-69 that differ from polygons 61-69 to which the remaining squares 41-49 correspond. Thus, there is a one-to-one correspondence between vertices 50-53 and vertices 54-57 such that vertices 50 is mapped to vertices 54, vertices 51 is mapped to vertices 55, vertices 52 is mapped to vertices 56 and vertices 53 is mapped to vertices 57. The shape of surface 28, however, results in the spatial relationship between vertices 54-57, for each of mapped polygons 61-69, being different from the initial spatial relationship between vertices 50-53 of a corresponding square 41-49. This is referred to as image distortion and results from the non-planarity, e.g., curvature, of surface 28, which provides vertices 54-57 with relative spatial positions that are offset from the relative spatial positions of vertices 50-53. Because each pair of vertices 54-57 are collinear, the aforementioned offset in the relative positions of vertices 54-57 results in an area of surface 28 to which each of squares 41-49 are mapped having a quadrilateral shape. In the present example mapped polygons 61-69 quadrilaterals 61-69; however, it should be understood that polygons 61-69 may be any polygonal shape. The aforementioned offset is derived from a calibration process that is described in U.S. patent application Ser. No. 11/550, 180.

Upon obtaining the offset values for vertices 54-57, determined is the offset for pixels 23 associated with any given quadrilateral 61-69, compared with an initial relative position of pixels 23 in a corresponding square 41-49. This is achieved employing well known techniques are described by George Wolberg in "Digitial Image Warping", IEEE Society Press Monograph, 1990. Specifically, a distortion matrix is determined for each of quadrilaterals 61-69 by solving a system of linear equations for vertices 54-57 associated therewith as follows:

$$a_{11} = x_1 - x_0 + a_{13}x_1 \quad (1)$$

$$a_{21} = x_3 - x_0 + a_{23}x_3 \quad (2)$$

$$a_{31} = x_0 \quad (3)$$

$$a_{12} = y_1 - y_0 + a_{13}y_1 \quad (4)$$

$$a_{22} = y_3 - y_0 + a_{23}y_3 \quad (5)$$

$$a_{32} = y_0 \quad (6)$$

where $x_0$ and $y_0$ are the x and y coordinates of vertices 54, $x_1$ and $y_1$ are the x and y coordinates for vertices 55, $x_2$ and $y_2$ are the x and y coordinates for vertices 57 and $x_3$ and $y_3$ are the x and y coordinates for vertices 56. The values $a_{11}$, $a_{12}$, $a_{13}$, $a_{21}$, $a_{22}$, $a_{23}$, $a_{31}$, $a_{32}$, and $a_{33}$ are the coefficients of the matrix that define the relative spatial position of pixels 23 in one of quadrilateral 61-69 associated therewith, with matrix, M, being as follows:

$$M = \begin{matrix} a_{11} & a_{12} & a_{13} \\ a_{21} & a_{22} & a_{23} \\ a_{31} & a_{32} & a_{33} \end{matrix}$$

After obtaining the matrix of coefficients $a_{11}$, $a_{12}$, $a_{13}$ $a_{21}$, $a_{22}$ $a_{23}$, $a_{31}$, $a_{32}$, and $a_{33}$ employing equations (1)-(6), an inverse matrix $M^{-1}$ is obtained using standard techniques.

Referring to both FIGS. 2 and 4, when obtaining inverse matrix $M^{-1}$ of matrix M for each quadrilateral 61-69, obtained is a plurality of inverse quadrilaterals 31-39, each of which is an inverse arrangement, or mapping, of pixels 23 of each sub-portion of the image associated with quadrilaterals 61-69. Specifically, the sub-portion of the image associated with quadrilateral 31 corresponds to image associated with square 41 and mapped inversely compared with the mapping of the sub-portion of the image associated with quadrilateral 61. The sub-portion of the image associated with quadrilateral 32 corresponds to the sub-portion of the image associated with square 42 and mapped inversely compared with the mapping of the sub-portion of the image associated with quadrilateral 62. The sub-portion of the image associated with quadrilateral 33 corresponds to the sub-portion of the image associated with square 43 and mapped inversely compared with the mapping of the sub-portion of the image associated with quadrilateral 63. The sub-portion of the image associated with quadrilateral 34 corresponds to the sub-portion of the image associated with square 44 and mapped inversely compared with the mapping of the sub-portion of the image associated with quadrilateral 64, and the sub-portion of the image associated with quadrilateral 35 corresponds to the sub-portion of the image associated with square 45 and mapped inversely compared with the mapping of the sub-portion of the image associated with quadrilateral 65. The sub-portion of the image associated with quadrilateral 36 corresponds to the sub-portion of the image associated with square 46 and mapped inversely compared with the mapping of the sub-portion of the image associated with quadrilateral 66. The sub-portion of the image associated with quadrilateral 37 corresponds to the sub-portion of the image associated with square 47 and mapped inversely compared with the mapping of the sub-portion of the image associated with quadrilateral 67. The sub-portion of the image associated with quadrilateral 38 corresponds to the sub-portion of the image associated with square 48 and mapped inversely compared with the mapping of the sub-portion of the image associated with quadrilateral 68, and the sub-portion of the image associated with quadrilateral 39 corresponds to the sub-portion of the image associated with square 49 and mapped inversely compared with the mapping of the sub-portion of the image associated with quadrilateral 69.

The inverse mapping of the sub-portions of the image to be rendered as represented by matrix $M^{-1}$ for each of cells 31-39 is stored in memory 16, shown in FIG. 1. In this manner, when image rendering device 12 renders image in region 20, processor 14 operates on the computer-readable instructions in memory 16 along with data contained therein that constitutes the image to be rendered in region 20, and maps the image in accordance with the information defining quadrilaterals 31-39. In this manner, the image is projected onto surface 28 with each sub-portion of the image impinging thereupon having a mapping of pixels 23 that are inverted compared to the mapping defined by quadrilaterals 61-69. The distortion presented by surface 28 operates to substantially attenuate, if not negate, the distortion presented by mapping each of quadrilaterals 31-39 in accordance with matrix $M^{-1}$. It should be noted that the image rendered in region 20 may comprise of a stream of video images, each frame of which is mapped onto surface 28 so as to be pre-distorted accordingly so that the non-planarity of surface 28 removes some, if not substantially all, of the distortion present.

Figure 6:
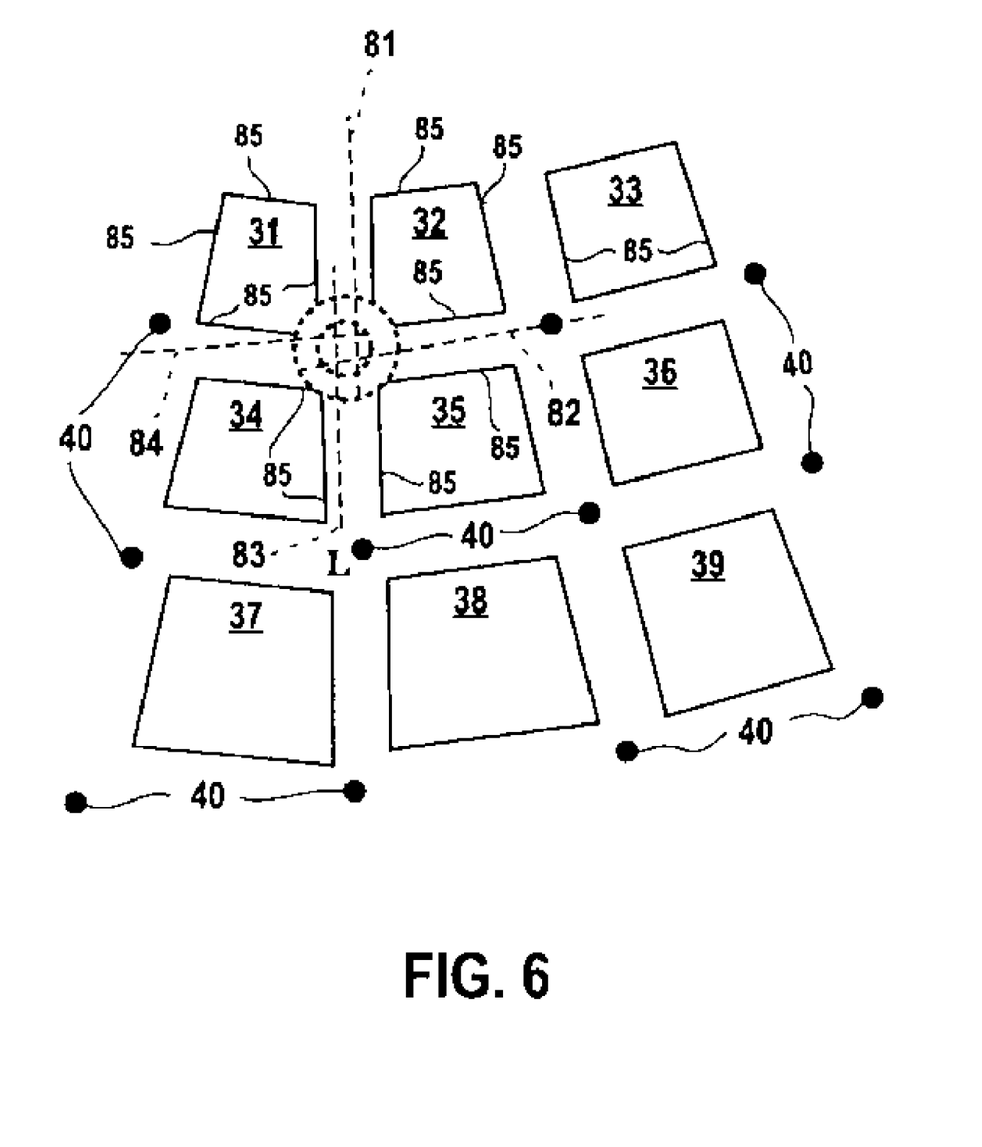
FIG. 6 is a plan view showing fitting of the cells, shown in FIG. 2, to a grid mapped to the non-planar surface, in accordance with an second alternate embodiment of the present invention.

Referring to FIG. 6, in accordance with an alternate embodiment, the distortion present in an image being rendered in region 20 may be improved by fitting edges of adjacent inverted quadrilaterals 31-39 to one or more linear functions 81, 82, 83 and 84 located between edges 85 of quadrilaterals 31-39. Specifically, employing the least-squares fit solution, the sub-portion of the image associated with quadrilateral 31 may be varied to change the spatial relationship among the pixels thereof so that the edge of quadrilateral moves toward and terminates at function 81. Similarly, the sub-portion of the image associated with quadrilateral 32 may be varied to change the spatial relationship among the pixels thereof so that the edge of quadrilateral moves toward and terminates at function 81. Similarly, the sub-portion of the image associated with quadrilateral 31 may be varied to change the spatial relationship among the pixels thereof so that the edge of quadrilateral moves toward function 84, and the sub-portion of the image associated with quadrilateral 34 may be varied to change the spatial relationship among the pixels thereof so that the edge of quadrilateral moves toward function 84. The sub-portion of the image associated with quadrilateral 32 may be varied to change the spatial relationship among the pixels thereof so that the edge of quadrilateral moves toward function 82, and the sub-portion of the image associated with quadrilateral 35 may be varied to change the spatial relationship among the pixels thereof so that the edge of quadrilateral moves toward function 82. This is continued until hiatuses present between the sub-portions of images associated with adjacent quadrilaterals 31-39 are attenuated, if not abrogated. In this manner, edges 85 of quadrilaterals 31-39 are fitted to a linear function while minimizing the change of the position of pixels 23 or cells 31-39 with respect to coordinates 40 of surface.

Figure 7:
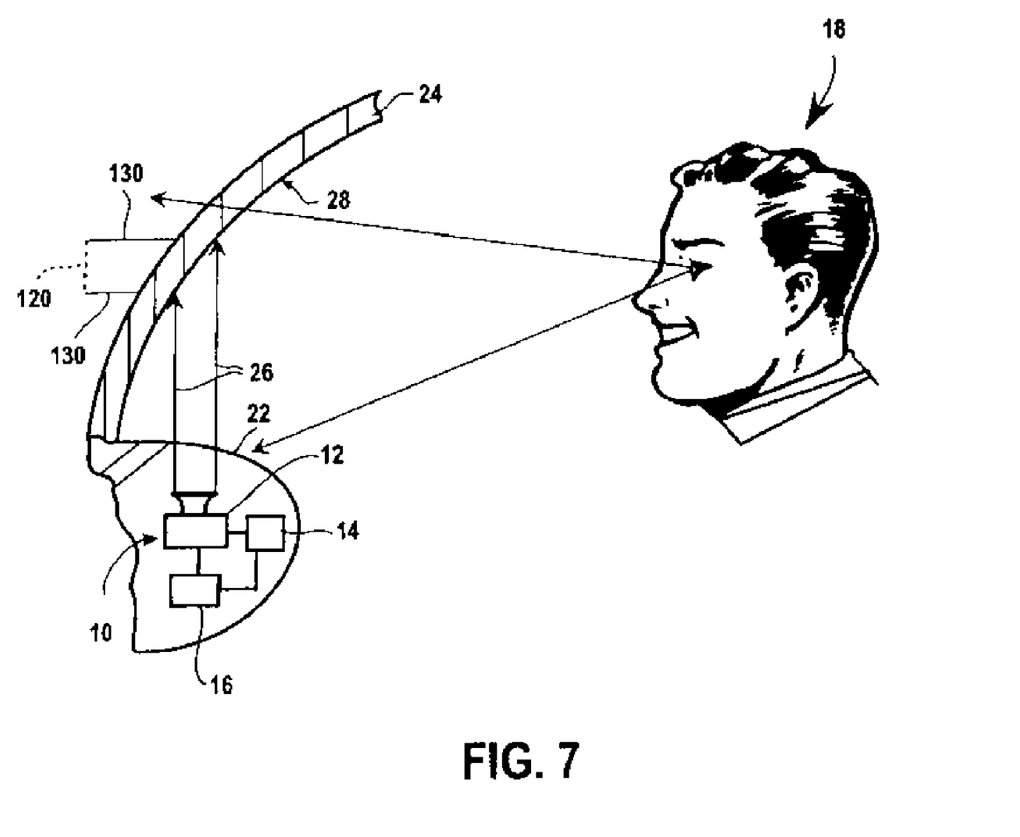
FIG. 7 is an illustration of an image rendering system in accordance with a third alternate embodiment of the present invention.

Referring to both FIGS. 1 and 4, in accordance with a second alternate embodiment, the quality of the image may be improved by associating, each of polygons 41-49 to an area of surface 28 having a minimum change in the non-planarity, e.g., radius of curvature. In addition, although nine polygons 41-49 are discussed, the image may be mapped to any number of polygons 41-49 and that the shape of polygons 41-49. The number of pixels associated with any given cell is a function of the radius of curvature of surface 28, with the understanding that the greater the radius of curvature the less pixels 23 per polygon 41-49; hence, the greater the number of polygons 41-49 will be required to render the image in region 20, disposed between non-planar surface 28 and user 18. It is possible, however, to have pixels 130 propagate through windshield 24 to render image in a viewing region 120 so that non-planar surface 28 is positioned between region 120 and user 18, shown in FIG. 7 in accordance with a third alternative embodiment of the present invention.

Figure 8:
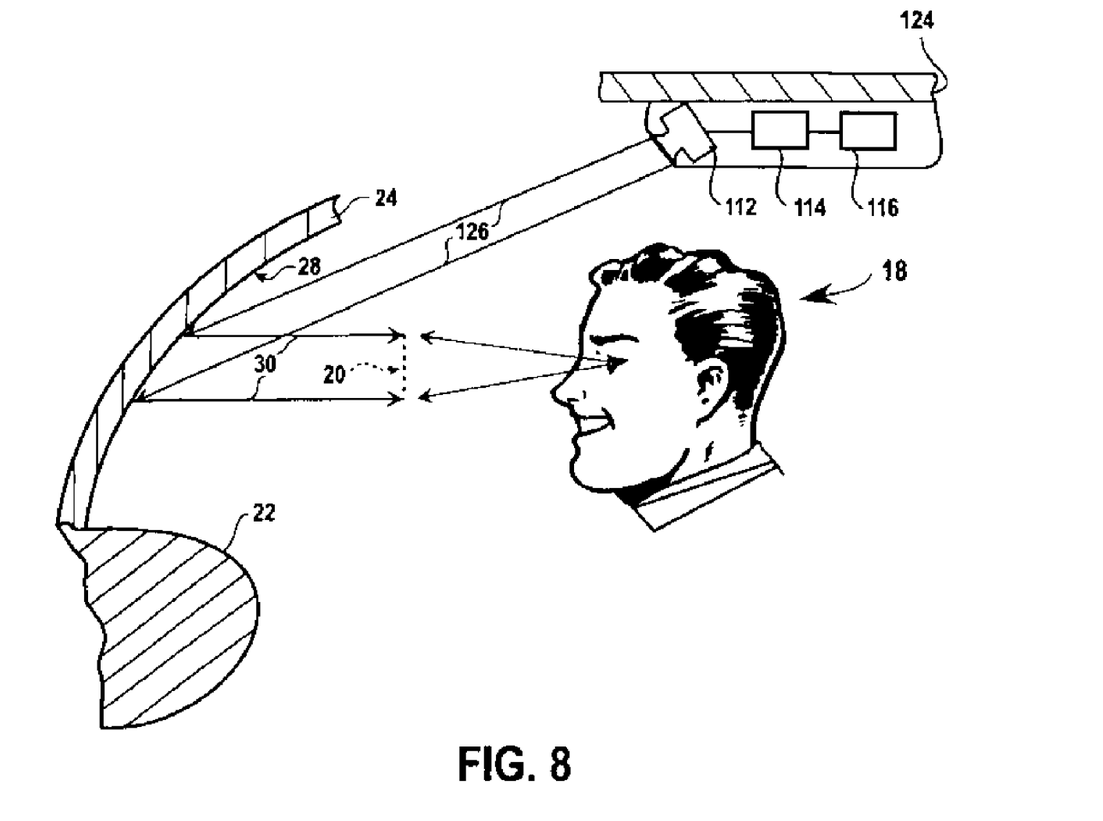
FIG. 8 is an image rendering system in accordance with a fourth alternate embodiment of the present invention.

Referring to FIG. 8 in a fourth alternate embodiment of the present invention, a system 110 may be mounted above a head of a user 18, such as in a roof 124 of an automobile invention includes an image rendering device 112, such as a projector, in data communication with a processor 14. A memory 116 is in data communication with processor 114. Image rendering device 112 so that a user 18 can visually perceive an image produced thereby in a viewing region 20 disposed between non-planar surface 28 and user. To that end, image rendering device 112 projects pixels 126 of the image to be rendered in region 120 toward surface 28 wherein the same reflects therefrom and renders an image in region 20. It is possible, however, to have pixels 230 propagate through windshield 24 to render image in a viewing region 220 so that non-planar surface 28 is positioned between region 220 and user 18.

The present examples are to be considered as illustrative and not restrictive. For example, the present discussion involved projecting of an image through a non-planar surface and reflecting an image from a non-planar surface. It should be understood that the present invention may be applied to rendering an image upon a non-planar surface such as the case when rendering an image upon a curved liquid crystal display employed as an electronic dashboard. Furthermore, other implementations of the invention are foreseen such as the use of anti-aliasing techniques, by implementing cubic filters, to minimize noise present in high-resolution signals represented as lower resolution signals. Therefore, the present inventions should not be limited to the details given herein, but may be modified within the scope of the appended claims.

What is claimed is:

1. A method of rendering an image that impinges upon a non-planar surface, said method comprising:
    mapping said image as a plurality of spaced-apart planar cells to surface coordinates of said non-planar surface, with each of said plurality of planar cells including multiple pixels of said image; and
    minimizing a distance between said plurality of planar cells while minimizing a change in distance between each of said plurality of planar cells with respect to said surface coordinates; and
    impinging said plurality of planar cells upon said non-planar surface,
    wherein mapping further includes associating pixels of said image with a plurality of polygons, each of which corresponds to one of said plurality of spaced-apart planar cells and includes multiple vertices having an initial spatial relationship and mapping said vertices to coordinates of said non-planar surface, producing mapped polygons and generating a matrix of distortions coefficients from the vertices of said mapped polygons, with said distortion coefficients defining a relative spatial relationship among said pixels upon said non-planar surface; producing, from said distortion matrix, an inverse matrix having a plurality of inverting coefficients associated therewith.

2. The method as recited in claim 1 wherein said minimizing further includes fitting edges of adjacent planar cells of said plurality of planar cells to a linear function, located between said edges, employing least-squares fit.

3. The method as recited in claim 1 wherein said mapping further includes filtering said distortion coefficients through a cubic filter to minimize the presence of noise.

4. The method as recited in claim 1 wherein said image includes a plurality of pixels each of which has an initial relative position with respect to the remaining pixels of said image and said mapping further includes obtaining a calibration matrix that defines an offset in said initial relative position between first and second subgroups of pixels and generating an inverse of said calibration matrix, defining an inverse matrix having a plurality of inverting coefficients associated, with said impinging further including defining a relative spatial relationship among said pixels of each of said plurality of planar cells being defined by said inverting coefficients.

5. The method as recited in claim 1 further including impinging said image upon said non-planar surface and rendering said image spaced-apart from said non-planar surface.

6. The method as recited in claim 1 further including impinging said image upon said non-planar surface and rendering said image upon said non-planar surface.

7. The method as recited in claim 1 further including transmitting said image through said non-planar surface.

8. The method as recited in claim 1 further including reflecting said image from said non-planar surface.

* * * * *

UNITED STATES PATENT AND TRADEMARK OFFICE
CERTIFICATE OF CORRECTION

| | | |
|---|---|---|
| PATENT NO. | : 7,873,233 B2 | Page 1 of 1 |
| APPLICATION NO. | : 11/550153 | |
| DATED | : January 18, 2011 | |
| INVENTOR(S) | : Tatiana Pavlovna Kadantseva et al. | |

It is certified that error appears in the above-identified patent and that said Letters Patent is hereby corrected as shown below:

Column 8, line 24 after "surface;" insert --and--

Signed and Sealed this
Fifth Day of April, 2011

David J. Kappos
*Director of the United States Patent and Trademark Office*